(12) United States Patent
Thiele

(10) Patent No.: US 7,866,739 B2
(45) Date of Patent: Jan. 11, 2011

(54) MOTOR VEHICLE HAVING A SUNROOF SYSTEM WITH A CONTOURED DRAINTUBE

(75) Inventor: Steven R. Thiele, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/179,305

(22) Filed: Jul. 24, 2008

(65) Prior Publication Data

US 2010/0019544 A1 Jan. 28, 2010

(51) Int. Cl.
B60J 7/043 (2006.01)
(52) U.S. Cl. ........................ 296/208; 296/213
(58) Field of Classification Search .............. 296/208, 296/213; 138/119
See application file for complete search history.

(56) References Cited

U.S. PATENT DOCUMENTS

| | | | | |
|---|---|---|---|---|
| 2,991,120 | A | * | 7/1961 | Barenyi ...................... 296/213 |
| 3,151,905 | A | | 10/1964 | Reuther et al. |
| 3,581,778 | A | * | 6/1971 | Korejwa et al. ............. 138/119 |
| 3,624,800 | A | * | 11/1971 | Swick ............................ 251/4 |
| 4,844,532 | A | | 7/1989 | Ono et al. |
| 4,892,351 | A | | 1/1990 | Ono et al. |
| 6,189,961 | B1 | * | 2/2001 | Poliskie et al. ............... 296/213 |
| 6,641,202 | B2 | | 11/2003 | Graf et al. |
| 7,121,618 | B2 | | 10/2006 | Uehara et al. |
| 7,374,234 | B2 | * | 5/2008 | Deschatres et al. .......... 296/208 |
| 7,578,549 | B2 | * | 8/2009 | Betzl et al. ................... 296/213 |
| 2003/0029512 | A1 | * | 2/2003 | Kober ......................... 138/118 |
| 2006/0001245 | A1 | | 1/2006 | Romig |

FOREIGN PATENT DOCUMENTS

| | | | |
|---|---|---|---|
| JP | 62178453 | | 8/1987 |
| KR | 2003015726 | * | 2/2003 |

OTHER PUBLICATIONS

Watergardeningdirect,http://web.archive.org/web/20071008063443/http://www.watergardeningdirect.com/acatalog/Corrugated_HO . . . website, Sep. 24, 2007.three pages.*

* cited by examiner

Primary Examiner—Dennis H Pedder
(74) Attorney, Agent, or Firm—Plumsea Law Group, LLC; Mark E. Duell

(57) ABSTRACT

A sunroof system for a motor vehicle is disclosed. The sunroof system includes a draintube for expelling fluid that enters the sunroof system from an exterior of the motor vehicle. A section of the draintube may have a one-piece configuration that includes a first portion and a second portion with different cross-sectional shapes. In some configurations, the second portion may have a lesser thickness than the first portion, and the second portion may be located within a pillar of the motor vehicle. In further configurations, the second portion may be located within a pillar of the motor vehicle and adjacent to an airbag component of the motor vehicle. In manufacturing the draintube, a portion of the tube may be heated and compressed to convert a circular cross-section to a non-circular cross-section.

20 Claims, 12 Drawing Sheets

MOTOR VEHICLE HAVING A SUNROOF SYSTEM WITH A CONTOURED DRAINTUBE

BACKGROUND OF THE INVENTION

1. Field of the Invention

The present invention relates to motor vehicles and in particular to draintubes for a sunroof system of the motor vehicle.

2. Description of Related Art

A motor vehicle may include a sunroof system that permits natural light and air to enter a passenger compartment of the motor vehicle. Sunroof systems generally include a sunroof panel that is movable between a closed position and an open position. When in the closed position, the sunroof panel is located within an opening in a roof panel of the motor vehicle. Although light may pass through the sunroof panel, seals around the sunroof panel generally prevent air and water from passing through the opening in the roof panel. In some sunroof systems, a secondary panel may be movable from within the passenger compartment to also block light from entering the passenger compartment when in the closed position. When the sunroof system is in the open position, the sunroof panel moves away from the opening in the roof panel and retracts into an area between the roof panel and a headliner, thereby permitting light and air to enter the passenger compartment through the opening in the roof panel.

Although the dimensions of the sunroof panel and the opening in the roof panel are substantially identical, sunroof systems generally include a gap between the sunroof panel and the opening in the roof panel. In order to prevent water or other fluids from passing through the gap and into an interior of the motor vehicle, a rubber molding or other seal may extend around the sunroof panel or the opening in the roof panel. As an alternative to the seal or in addition to the seal, a sunroof system may include a tray located below and around a periphery of the opening in the roof panel to collect the water. A draintube extends from the tray to channel the water to an exterior area of the motor vehicle. This general configuration is disclosed in U.S. Pat. No. 7,121,618 to Uehara, et al.; U.S. Pat. No. 4,892,351 to Ono, et al.; and U.S. Pat. No. 4,844,532 to Ono, et al., each of which is incorporated herein by reference.

In order to channel the water to the exterior area of the motor vehicle, draintubes often extend down at least one of the plurality of pillars located between windows of the motor vehicle. In addition to the draintubes, the pillars may include support members that prevent the roof from collapsing into the passenger compartment in a rollover accident, conduits for electrical wires or pneumatic elements, components from an airbag deployment system, or seatbelt components, for example. Space within the pillars may, therefore, be limited.

SUMMARY OF THE INVENTION

One aspect of the invention relates to a sunroof system for a motor vehicle. The sunroof system includes a draintube for expelling fluid that enters the sunroof system from an exterior of the motor vehicle. A section of the draintube has a one-piece configuration that includes a first portion and a second portion with different cross-sectional shapes.

In another aspect, the invention provides a sunroof system for a motor vehicle with a draintube for expelling fluid that enters the sunroof system from an exterior of the motor vehicle. A section of the draintube has a one-piece configuration that includes a first portion and a second portion. The second portion has a lesser thickness than the first portion, and the second portion is located within a pillar of the motor vehicle.

In a further aspect, the invention provides a sunroof system for a motor vehicle that includes at least one roof panel, a sunroof panel, a tray, and a draintube. The roof panel defines an opening. The sunroof panel is movable between a closed position and an open position, with the sunroof panel being located within the opening in the closed position, and the sunroof panel being at least partially located apart from the opening in the open position. The tray collects fluid that enters the sunroof system between the roof panel and the sunroof panel. The draintube extends from the tray for expelling the fluid, and the draintube has a section with a one-piece configuration that includes a first portion and a second portion. The first portion is located adjacent to the roof panel and has a circular cross-section. The second portion is located within a pillar of the motor vehicle and adjacent to an airbag component of the motor vehicle, and the second portion has a non-circular cross-section.

In yet another aspect, the invention provides a method of manufacturing a draintube for a sunroof system of a motor vehicle. The method includes providing a tube formed from a thermoplastic material and having a substantially circular cross-section. A portion of the tube is heated, and the portion of the tube is compressed to convert the circular cross-section to a non-circular cross-section.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The following discussion and accompanying figures disclose a motor vehicle 100 that incorporates a sunroof system 120 in accordance with various aspects of the invention. Although motor vehicle 100 is depicted as having the general configuration of a car, concepts associated with sunroof system 120 may be incorporated into any moving vehicle that is capable of carrying one or more human occupants and powered by any form of energy. The term "motor vehicle" or variants thereof are intended, therefore, to include cars, trucks, vans, minivans, sport utility vehicles, motorcycles, scooters, boats, personal watercraft, and aircraft, for example. Accordingly, a wide variety of motor vehicle types may incorporate concepts associated with sunroof system 120. As a further matter, "sunroof system" or variants thereof are intended to encompass a variety of systems that permit light or air to enter a passenger compartment of a motor vehicle through a roof area of the motor vehicle. As examples, concepts associated with sunroof system 120 may be applied to sunroofs, moonroofs, roof panels having removable elements (e.g., T-top systems), or roof panels that retract into a trunk compartment (e.g., hardtop convertibles). Accordingly, a wide variety of systems that permit light or air to enter a passenger compartment of a motor vehicle through a roof area of the motor vehicle may incorporate one or more of the various concepts associated with sunroof system 120.

Figure 1:
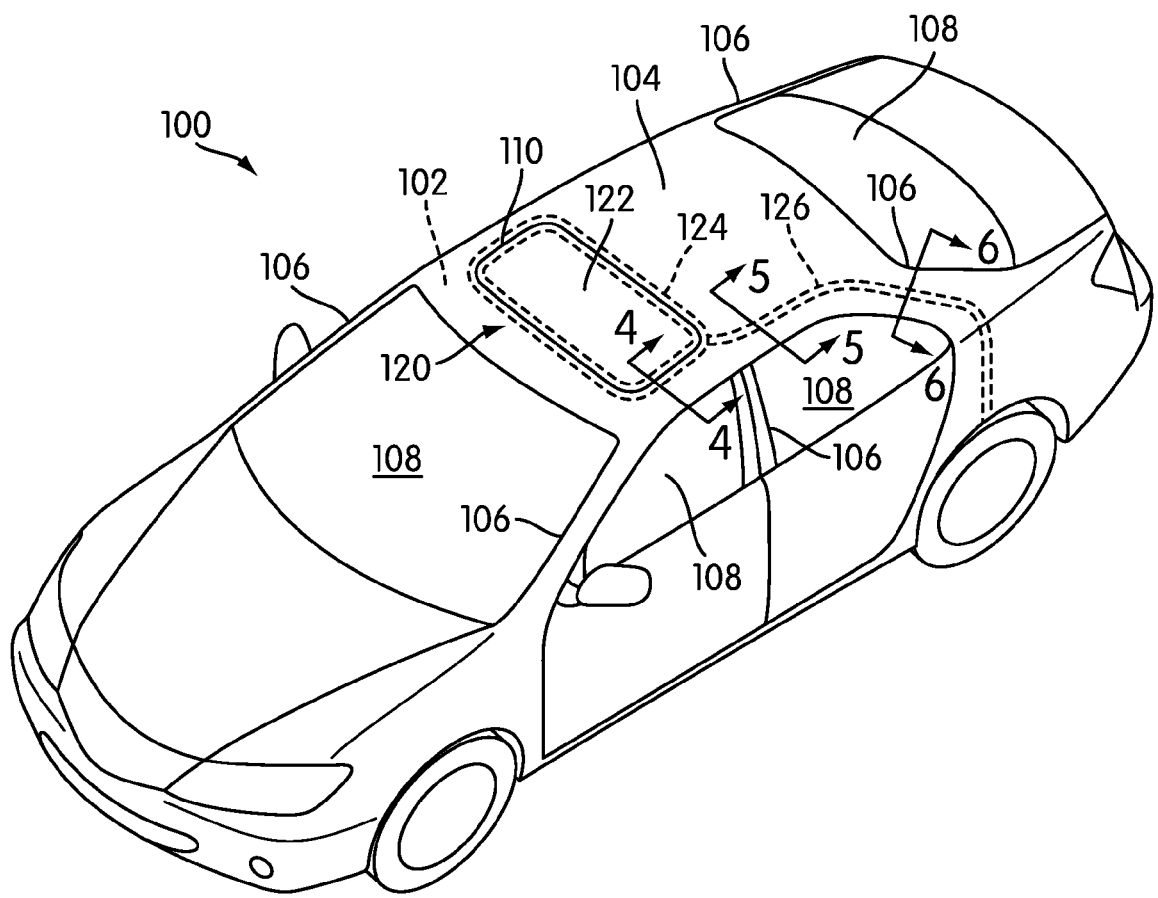
FIG. 1 is a perspective view of an embodiment of a motor vehicle incorporating a sunroof system.

Motor vehicle 100, which is depicted in FIG. 1, includes various systems that facilitate the comfortable and safe transport of occupants and cargo. In general, one of the occupants (i.e., a driver) controls the movement of motor vehicle 100 from within a passenger compartment 102. A roof panel 104 extends over passenger compartment 102 and is joined with various pillars 106 that extend in a downward direction from roof panel 104. A plurality of windows 108 are located between pillars 106 to permit light to enter passenger compartment 102. Some of windows 108 may also open (i.e., roll down) at the discretion of the occupants to permit air to enter and circulate within passenger compartment 102.

Figure 2:
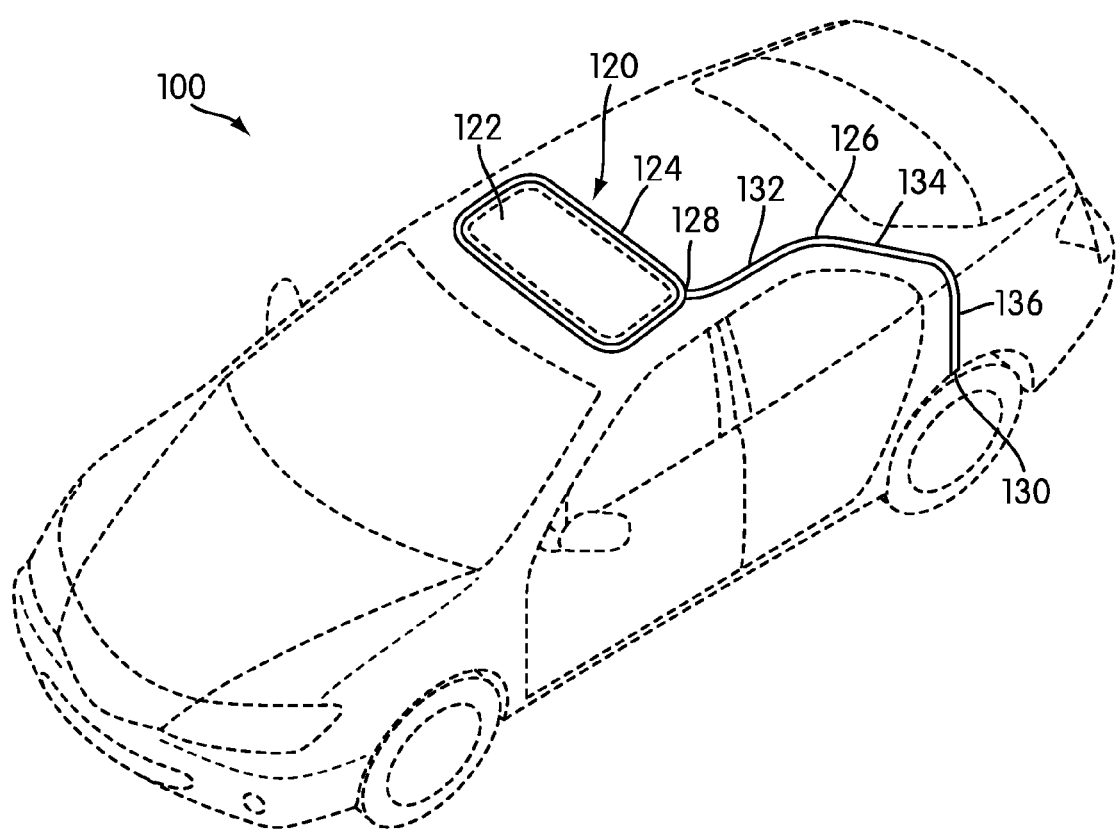
FIG. 2 is a first phantom perspective view of an embodiment of the motor vehicle depicting internal elements of the sunroof system.

As a supplement to windows 108, sunroof system 120 may also be utilized to permit light and air to enter passenger compartment 102. With reference to FIGS. 1 and 2, sunroof system 120 includes a sunroof panel 122 that is located within an aperture 110 in roof panel 104. Whereas roof panel 104 is generally formed from an opaque material (e.g., steel), sunroof panel 122 may be formed from a translucent or transparent material (e.g., clear or tinted polymer or glass) that transmits light to passenger compartment 102. In some configurations, a supplemental sliding panel may be located below sunroof panel 122 to permit the occupants to block the light from entering passenger compartment 102. That is, the supplemental panel may slide forward and backward to block light from passing through sunroof system 120 when in the closed position. Although translucent or transparent materials are suitable for sunroof panel 122, a variety of opaque materials may also be utilized for sunroof panel 122.

Figure 3:
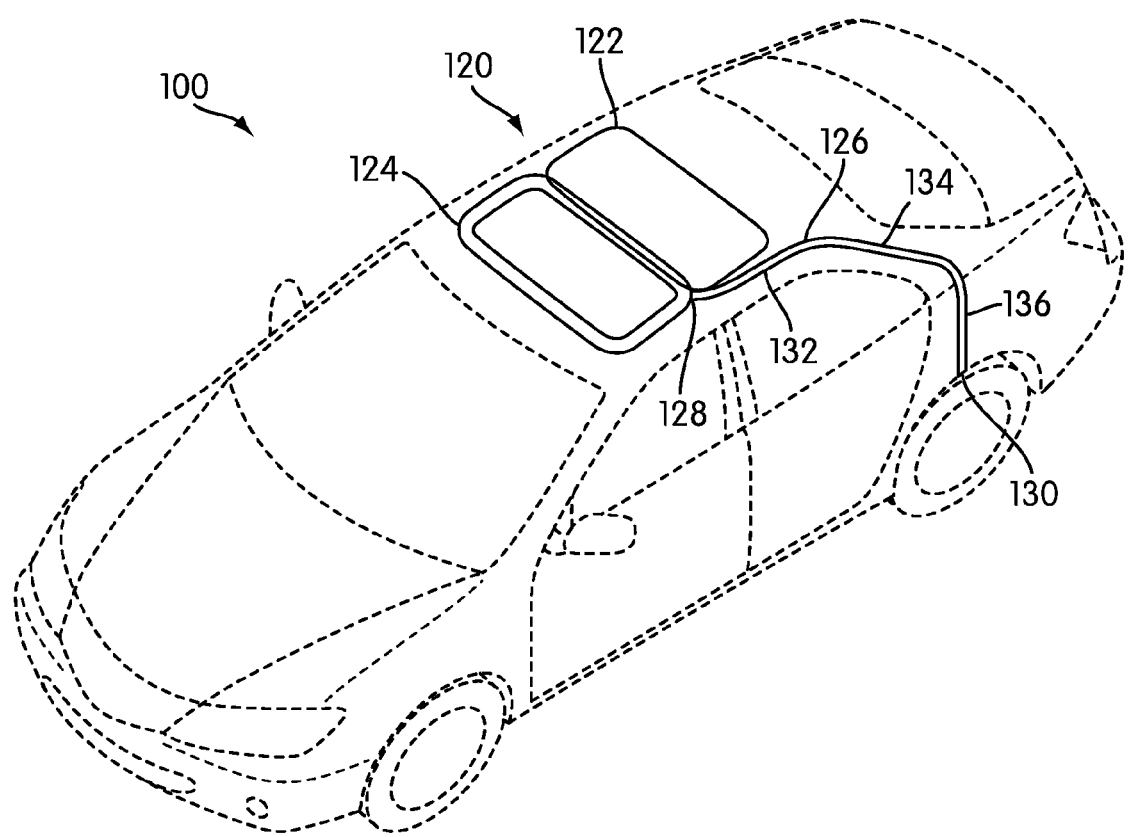
FIG. 3 is a second phantom perspective view of an embodiment of the motor vehicle depicting the internal elements of the sunroof system.

The occupants of passenger compartment 102 may operate sunroof system 120 such that sunroof panel 122 moves between a closed position and an open position. In the closed position, which is depicted in FIGS. 1 and 2, sunroof panel 122 is located within aperture 110 such that only light may pass into passenger compartment 102. More particularly, edges of sunroof panel 122 are adjacent to edges of aperture 110 such that an upper surface of sunroof panel 122 is generally co-planar with an upper surface of roof panel 104 and air is substantially prevented from passing through aperture 110. In the open position, which is depicted in FIG. 3, sunroof panel 122 is located apart from aperture 110 (i.e., within a recess between roof panel 104 and a headliner 112), thereby permitting both light and air to enter passenger compartment 102 through aperture 110. An electrical motor or a manually-operated mechanical system, for example, may be utilized to convert sunroof panel 122 between the open and closed positions.

Figure 4:
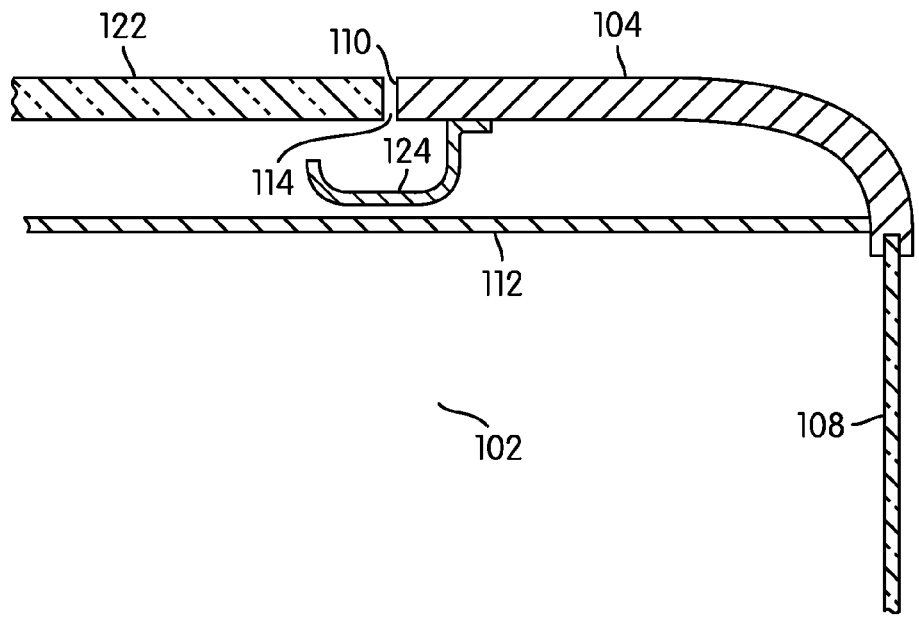
FIG. 4 is partial cross-sectional view of an embodiment of the motor vehicle, as defined by section line 4 in FIG. 1.

Sunroof system 120 also includes a tray 124 that is located below roof panel 104 and sunroof panel 122 to collect fluid (e.g., water) that enters sunroof system 120. That is, tray 124 is located below and around a periphery of aperture 110 and sunroof panel 122 to collect the fluid. While the dimensions of aperture 110 and sunroof panel 122 are substantially identical, a relatively narrow gap 114 is generally formed between the edges of aperture 110 and sunroof panel 122, as depicted in FIG. 4. Although a rubber molding or other seal may be located around aperture 110, some fluid may continue to enter sunroof system 120 through gap 114. Accordingly, tray 124 is located below roof panel 104 and sunroof panel 122 (i.e., under gap 114) to collect the fluid that enters sunroof system 120.

In order to expel the fluid collected by tray 124, a draintube 126 extends from tray 124 to an exterior of motor vehicle 100. When fluid passing through gap 114 is collected in tray 124, the fluid enters draintube 126, passes through a length of draintube 126, and drains out of sunroof system 120. Draintube 126 defines a first end 128 and an opposite second end 130. Whereas end 128 joins with tray 124 and forms an entry point for the fluid, end 130 is positioned proximal a lower area of motor vehicle 100 and forms an exit point for the fluid.

Figure 5:
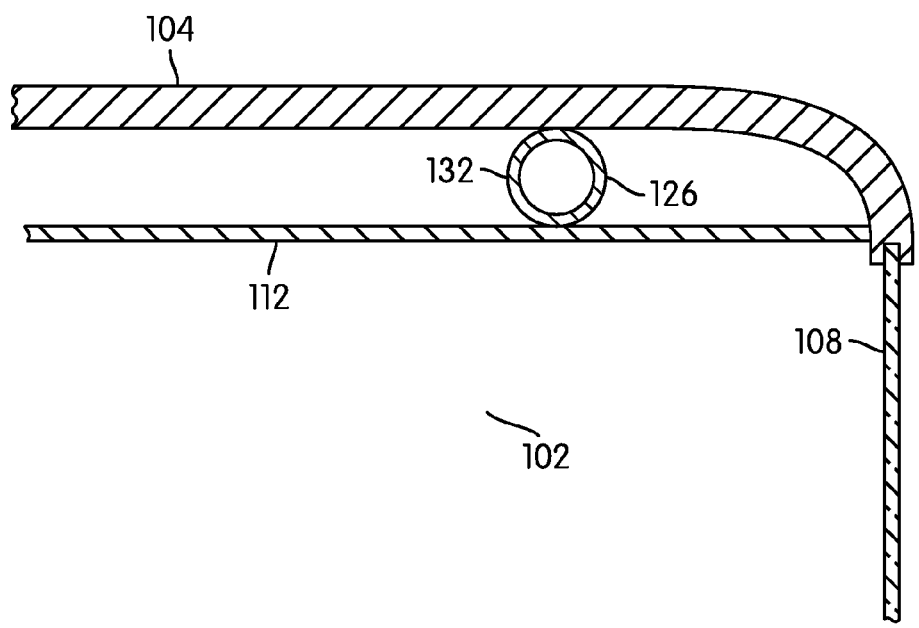
FIG. 5 is partial cross-sectional view of an embodiment of the motor vehicle, as defined by section line 5 in FIG. 1.
Figure 6:
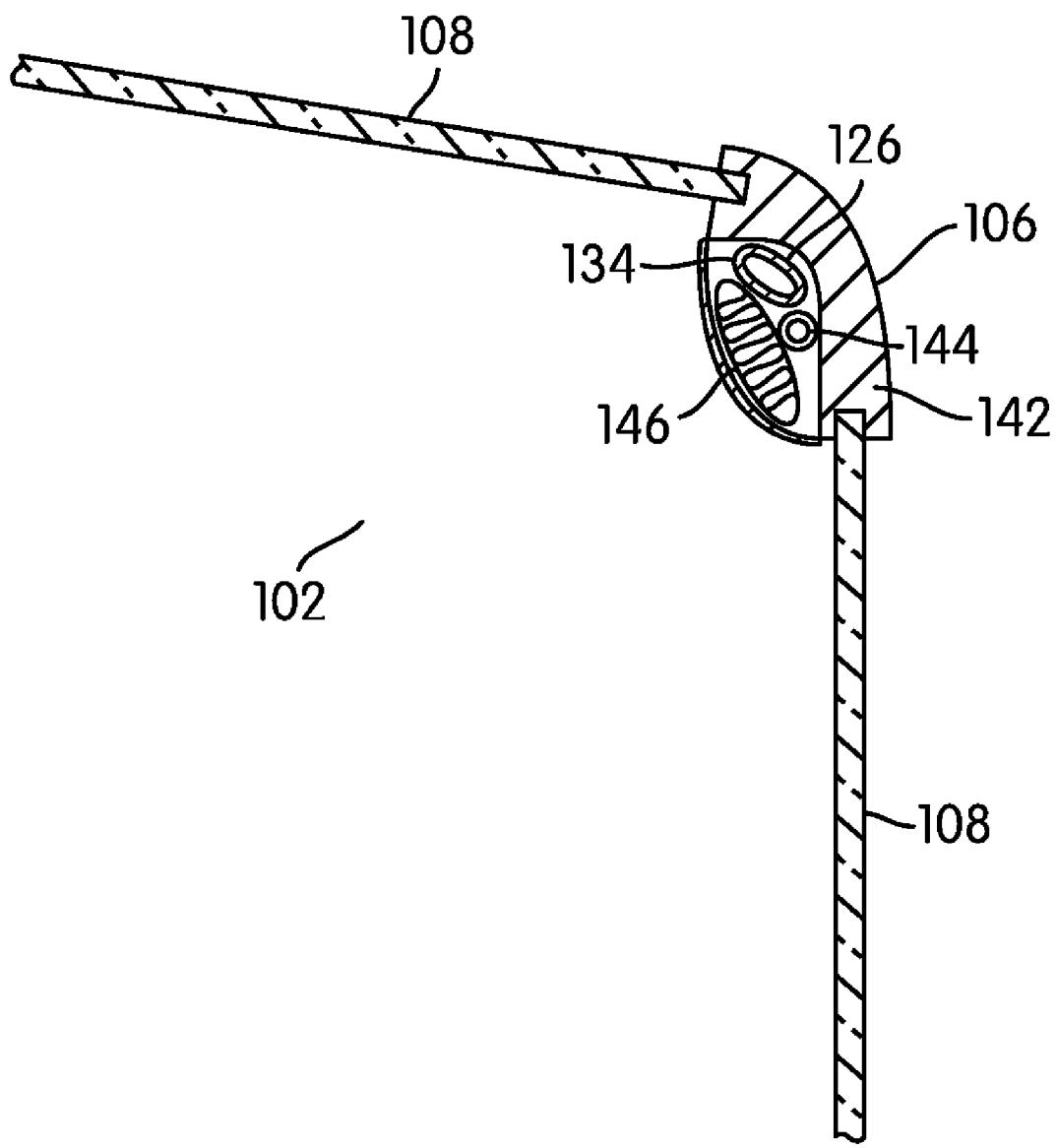
FIG. 6 is partial cross-sectional view of an embodiment of the motor vehicle, as defined by section line 6 in FIG. 1.
Figure 7:
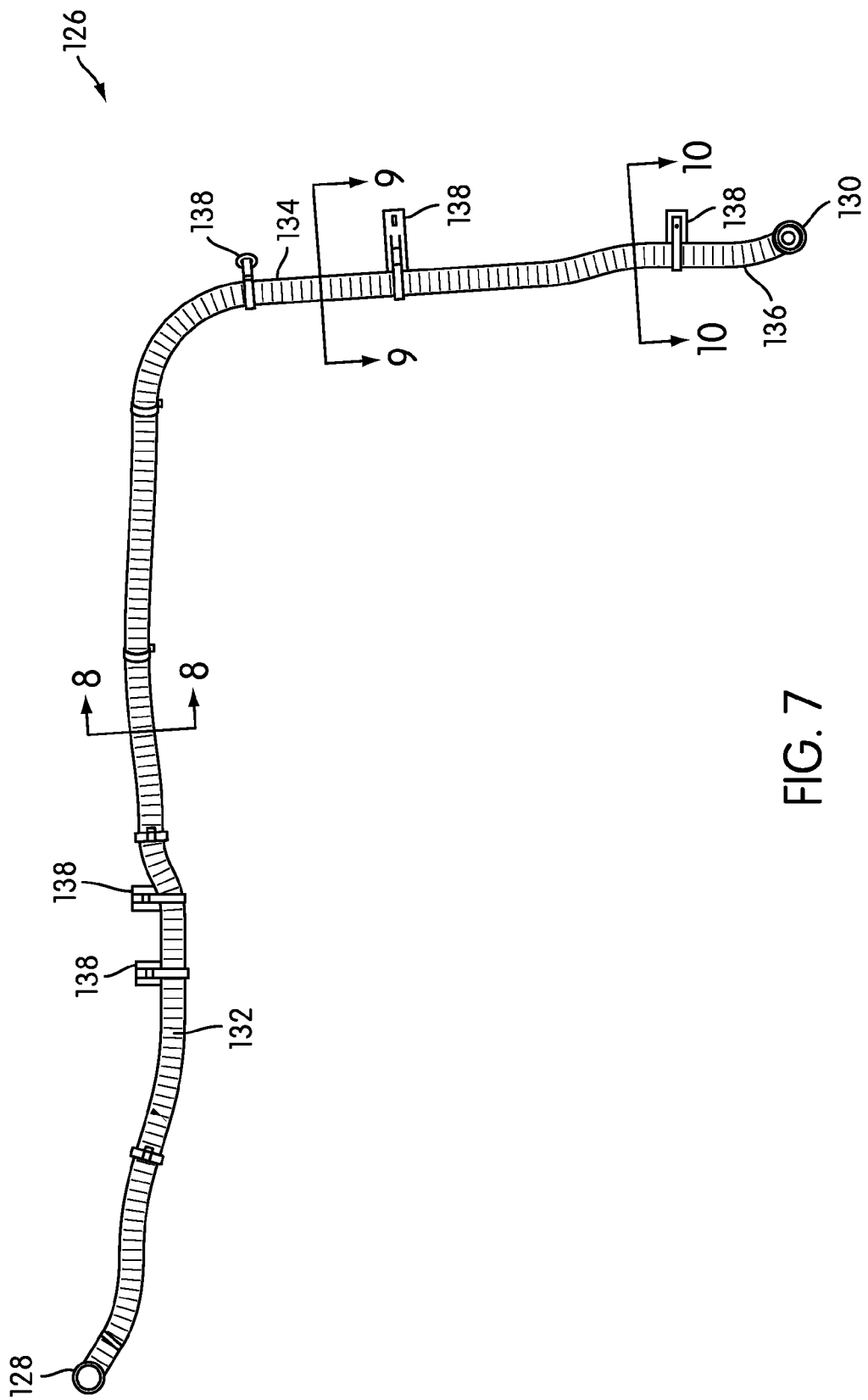
FIG. 7 is a plan view of a portion of an embodiment of a draintube of the sunroof system.

Draintube 126 is depicted in FIGS. 2, 3, and 7 as having a roof portion 132, a pillar portion 134, and a lower portion 136. Portions 132, 134, and 136 are not intended to demarcate distinct sections of draintube 126, but are intended to define general sections of draintube 126 that may be utilized for purposes of reference in the following discussion. Roof portion 132, which includes end 128, extends rearward from tray 124 and is positioned between roof panel 104 and headliner 112, as depicted in FIG. 5. Pillar portion 134, which is located between portions 132 and 136, extends downward and along one of pillars 106, as depicted in FIGS. 1, 2, and 6. Lower portion 136 extends further downward from pillar portion 134 to locate end 130 adjacent to the lower area of motor vehicle 100. Accordingly, when a fluid such as water collects in tray 124 and enters draintube 126 through end 128, the fluid passes through each of portions 132, 134, and 136 before being expelled to the environment outside of motor vehicle 100 from end 130.

Although a width and thickness draintube 126 is generally relatively narrow, the space available in different areas of motor vehicle 100 for portions 132, 134, and 136 varies significantly. In addition to roof portion 132, a variety of components are located within the area between roof panel 104 and headliner 112, including supports for roof panel 104, elements for securing headliner 112, electrical components for an overhead light source, and the motor operating sunroof system 120, for example. Given that the space between roof panel 104 and headliner 112 extends across a width of motor vehicle 100, this area generally provides ample space for both draintube 126 and the other components, as depicted in FIG. 5.

In comparison with the space between roof panel 104 and headliner 112, the space within each of pillars 106 is substantially limited. Referring to FIG. 6, the pillar 106 that includes pillar portion 134 includes a support member 142, a conduit 144, and an airbag component 146. Support member 142 is a steel or aluminum beam that prevents roof panel 104 from collapsing into passenger compartment 102 in the event of a rollover accident. Conduit 144 may include electrical wires or pneumatic elements that extend into the area between roof panel 104 and headliner 112. Airbag component 146 may be a portion of an airbag deployment system (e.g., a side curtain airbag) intended to protect the occupants of passenger compartment 102. Accordingly, the space within the pillar 106 that includes pillar portion 134 is substantially limited.

In addition to having limited space for the components within pillar 106, various components may benefit from specific locations. For example, airbag component 146 may require a location that is immediately adjacent to passenger compartment 102 in order to permit the airbag to deploy into passenger compartment 102. In configurations where airbag component 146 is located immediately adjacent to passenger compartment 102, pillar portion 134 may be located between and adjacent to each of airbag component 146 and support member 142 to permit unobstructed deployment of the airbag. By providing pillar portion 134 with the non-circular cross-sectional shape, thereby reducing the overall thickness of pillar portion 134, additional space is provided to accommodate the locations of other components within pillar 106.

Figure 8:
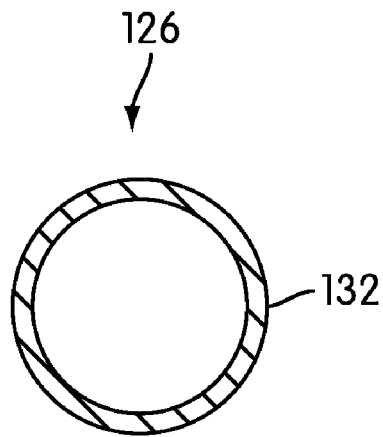
FIG. 8 is a cross-sectional view of an embodiment of the draintube, as defined by section line 8 in FIG. 7.

A determination on whether draintube 126 fits within particular areas of motor vehicle 100 is at least partially dependent upon the cross-sectional shape and dimensions of draintube 126. End 128 and the length of draintube 126 extending between roof panel 104 and headliner 112 (i.e., roof portion 132) has a circular cross-sectional shape, as depicted in each of FIGS. 5 and 8. Although the dimensions of roof portion 132 may vary significantly, a suitable diameter is approximately 18 millimeters, but may range from 5 to 100 millimeters or more, and may range from 10 to 20 millimeters in some configurations. Given the relatively few components in the space between roof panel 104 and headliner 112, this shape and dimension is sufficient for roof portion 132.

Figure 9:
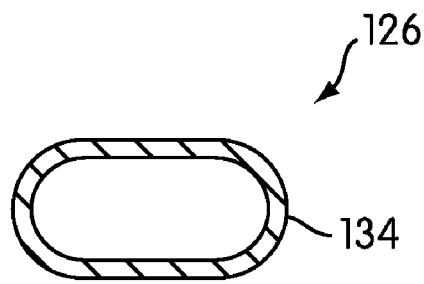
FIG. 9 is a cross-sectional view of an embodiment of the draintube, as defined by section line 9 in FIG. 7.
Figure 10:
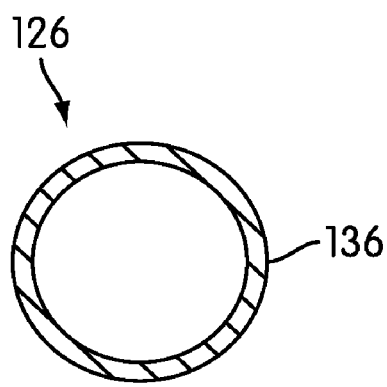
FIG. 10 is a cross-sectional view of an embodiment of the draintube, as defined by section line 10 in FIG. 7.
Figure 11:
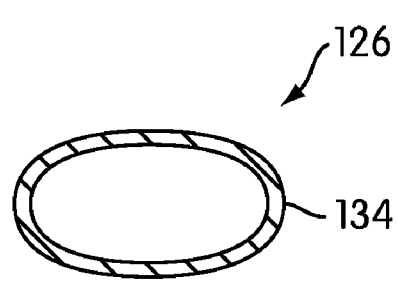
FIG. 11 is a cross-sectional views corresponding with FIG. 9 and depicting an alternate configuration of the draintube.
Figure 12:
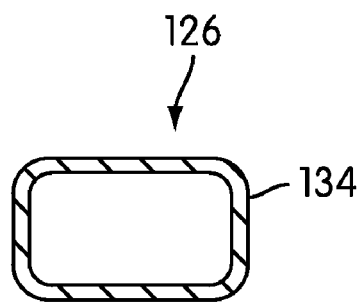
FIG. 12 is a cross-sectional views corresponding with FIG. 9 and depicting an alternate configuration of the draintube.
Figure 13:
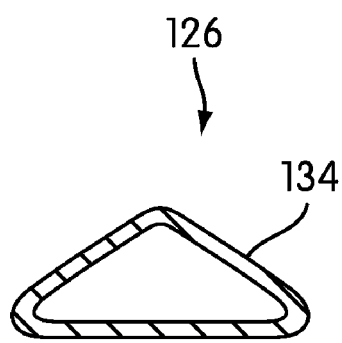
FIG. 13 is a cross-sectional views corresponding with FIG. 9 and depicting an alternate configuration of the draintube.
Figure 14:
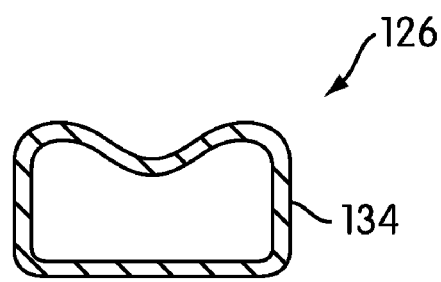
FIG. 14 is a cross-sectional views corresponding with FIG. 9 and depicting an alternate configuration of the draintube.
Figure 15:
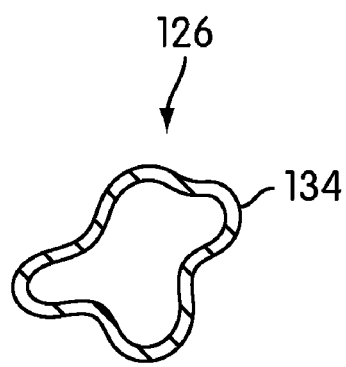
FIG. 15 is a cross-sectional views corresponding with FIG. 9 and depicting an alternate configuration of the draintube.

In comparison with roof portion 132, pillar portion 134 has a non-circular cross-section. More particularly, the cross-sectional shape of pillar portion 134 is elongate with two substantially straight and parallel sides and two rounded end areas, as depicted in each of FIGS. 6 and 9. Although the dimensions of pillar portion 134 may vary significantly, a suitable width (i.e., distance between the rounded end areas) is 22.3 millimeters and a suitable thickness (i.e., distance between the sides) is 10 millimeters, but each of these dimensions may vary significantly to range from 5 to 100 millimeters or more. Given that the pillar 106 having pillar portion 134 includes support member 142, conduit 144, and airbag component 146, space is limited and the non-circular cross-section provides for a more compact arrangement of the various components. That is, the number of components that may be located in the pillar 106 having pillar portion 134 is maximized by modifying the cross-sectional shape and, therefore, the dimensions of pillar portion 134. Lower portion 136 also has a circular cross-sectional shape, as depicted in FIG. 9., and may have dimensions that are substantially similar to roof portion 132.

The cross-sectional shape of pillar portion 134 is discussed above as having two substantially straight and parallel sides and two rounded end areas. This shape is suitable for locating pillar portion 134 among support member 142, conduit 144, and airbag component 146. As the components within pillar 106 change shape or number, or as the path of draintube 126 through motor vehicle 100 changes, for example, other cross-sectional shapes may be beneficial. Referring to FIGS. 11-15, a variety of non-circular cross-sectional shapes are depicted, including an elliptical shape, a rectangular shape, a triangular shape, an indented rectangular shape, and a non-regular shape. Accordingly, the specific cross-sectional shape of draintube 126 may vary significantly.

Although each of roof portion 132 and lower portion 136 are depicted as having a circular cross-section, specific areas or the entirety of portions 132 and 136 may have non-circular cross-sections, including any of the non-circular cross-sections depicted in FIGS. 11-15. As discussed above, pillar portion 134 has a non-circular cross-section in order to provide for a more compact arrangement of the various components in one of pillars 106. Similarly, non-circular cross-sections in one of portions 132 or 136 may also be beneficial in areas where space is limited. For example, a support for roof panel 104 may lessen the space between roof panel 104 and headliner 112, and roof portion 132 may have a non-circular cross-section in the area of the support. Similarly, a specific area of lower portion 136 may have a non-circular cross-section to extend around a frame or other component in the lower area of motor vehicle 100. Accordingly, specific areas of draintube 126 other than pillar portion 134 may have non-circular cross-sections in some configurations of motor vehicle 100.

Figure 16:
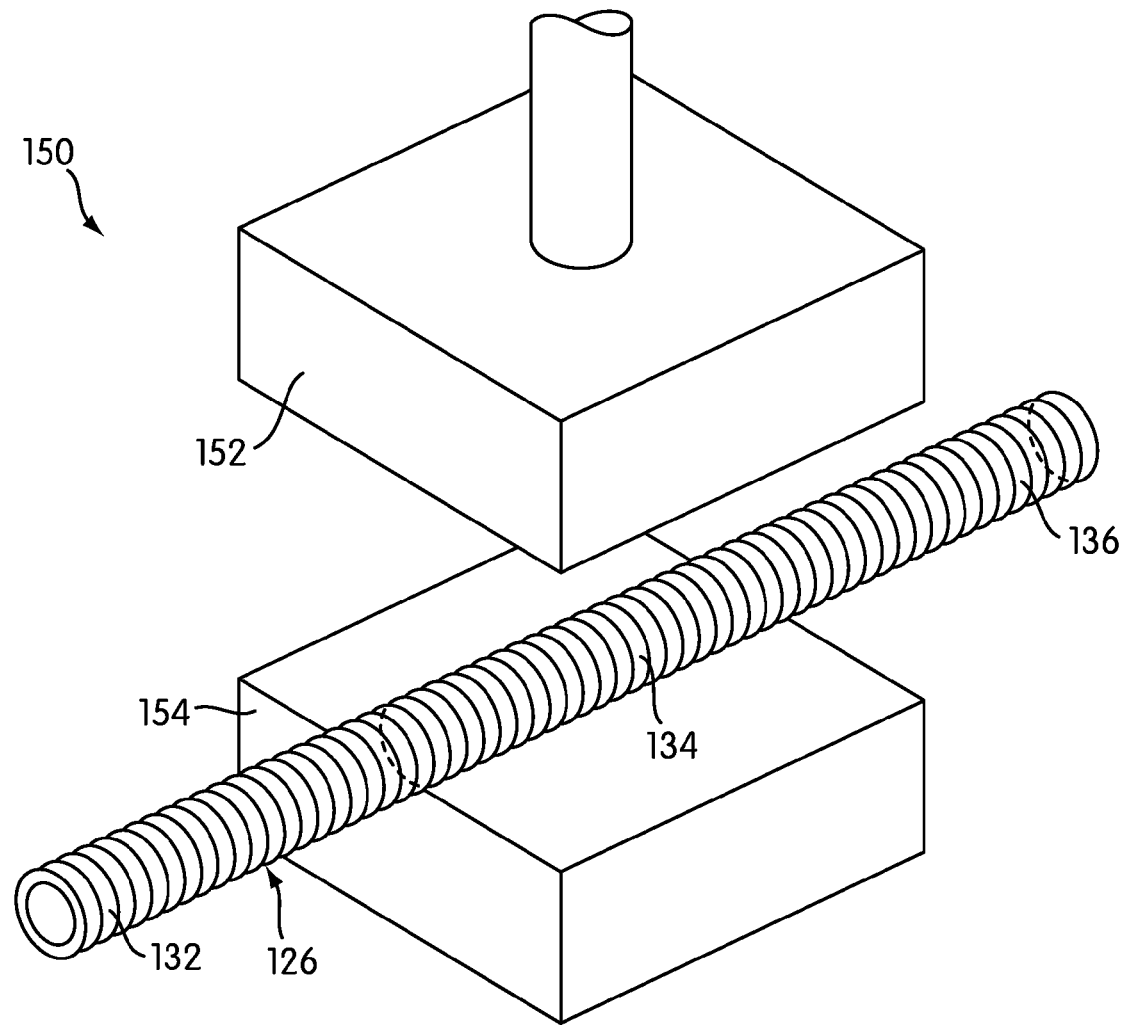
FIG. 16 is a schematic perspective view of a method of manufacturing the draintube.
Figure 17:
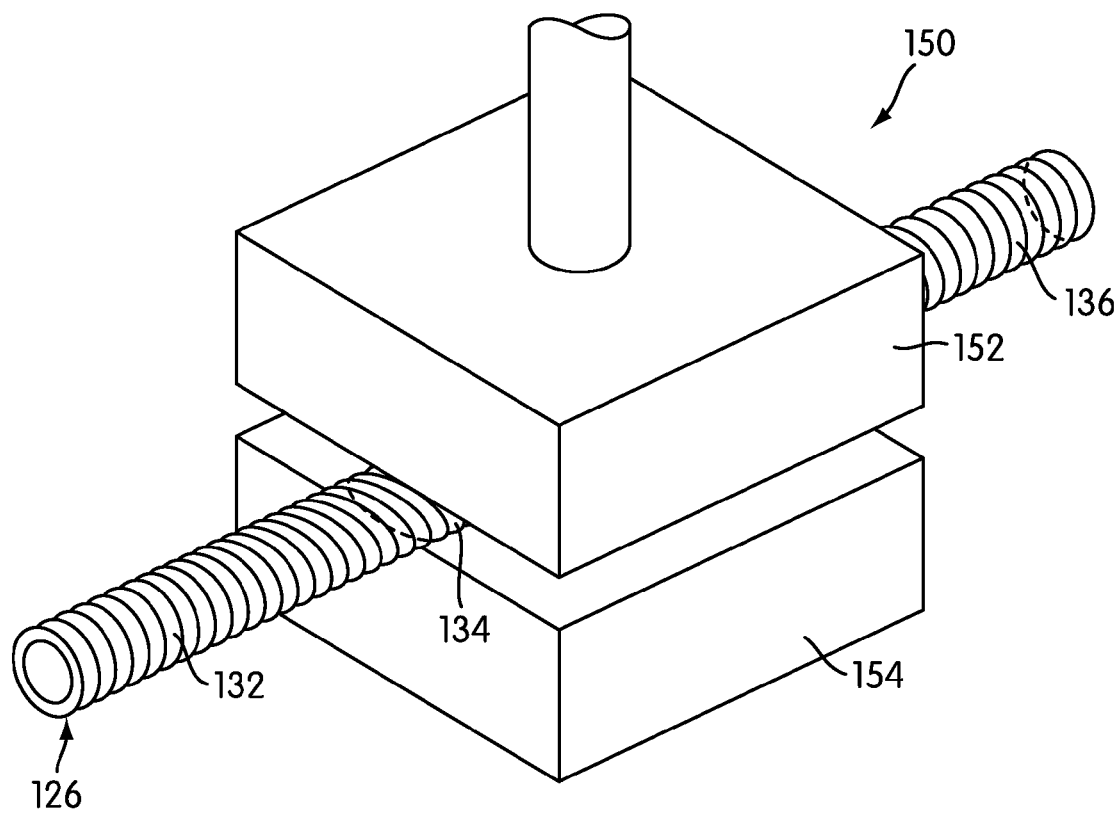
FIG. 17 is a schematic perspective view of the method of manufacturing the draintube.
Figure 18:
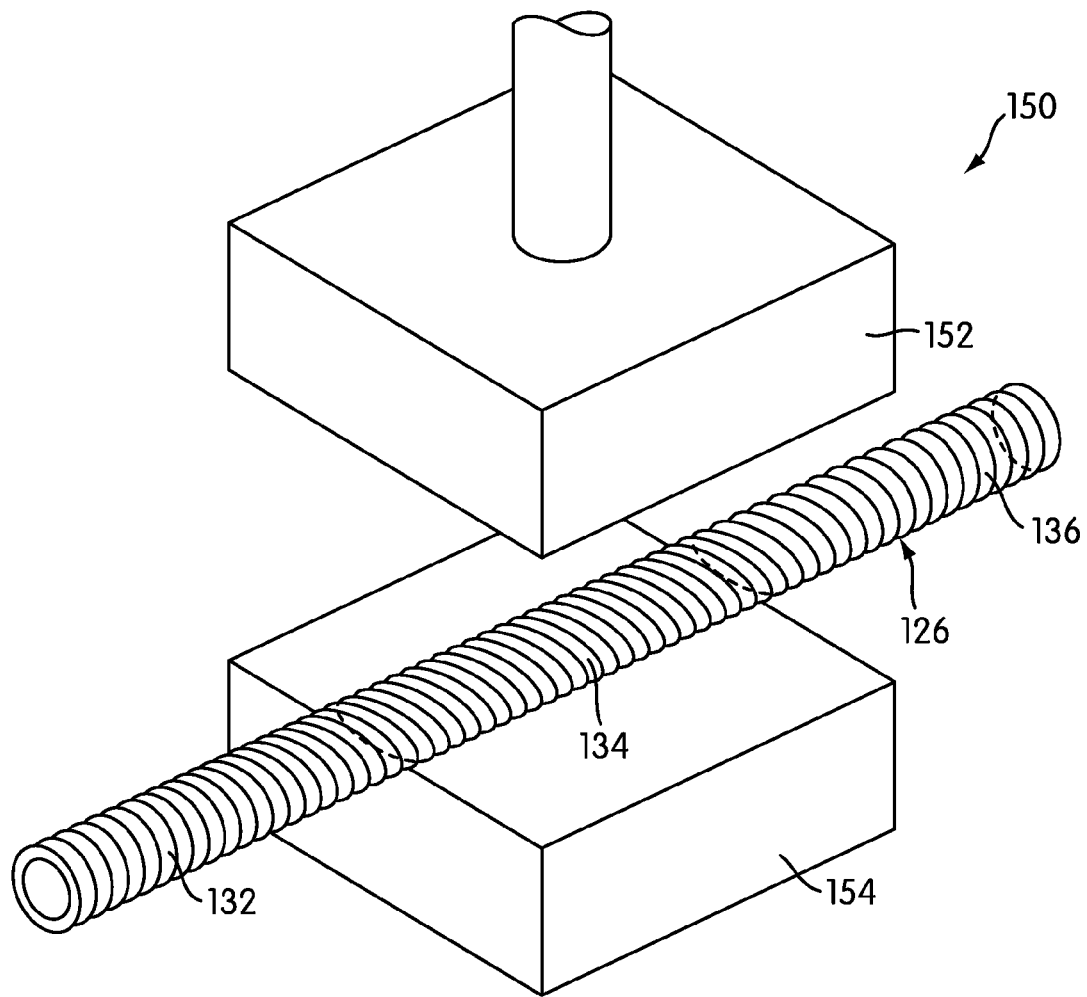
FIG. 18 is a schematic perspective view of the method of manufacturing the draintube.

A variety of manufacturing techniques may be utilized to form draintube 126. An example of a suitable manufacturing technique is schematically-illustrated in FIGS. 16-18. Initially, a thermoplastic polymer material is extruded to form draintube 126 with a substantially straight configuration having a circular cross-sectional shape throughout the length. Draintube 126 is then heated, if necessary, and located between opposing portions 152 and 154 of a press, as depicted in FIG. 16. An area corresponding with pillar portion 134 is then compressed by press 150, as depicted in FIG. 17, in order to impart the non-circular cross section to pillar portion 134. That is, draintube 126 may be initially manufactured with a circular cross-section and then thermoformed to have the non-circular cross-section in specific locations, as depicted in FIG. 18. Once removed from press 150, draintube 126 may then be angled or otherwise bent in various locations (e.g., between roof portion 132 and pillar portion 134) to impart a shape that extends through the various areas and around the various components of motor vehicle 100. As a variation upon this technique, a blowmolding process may be utilized to form a substantially straight and circular tube that becomes draintube 126. The tube may then be angled or otherwise bent in various locations and compressed in an area corresponding with pillar portion 134 in order to impart the non-circular cross section. As an example of another manufacturing technique that is suitable for draintube 126, a mold with the shape of draintube 126 may be formed and either a thermoforming or blow molding process may be utilized to shape draintube 126 from polymer materials. Accordingly, draintube 126 may be manufactured through a variety of processes.

Although draintube 126 may be formed of unitary (i.e., one-piece) construction between ends 128 and 130, draintube 126 may also be formed from two or more joined tubes in other configurations of sunroof system 120. For example, pillar portion 134 and lower portion 136 may be formed of unitary construction through any of the techniques discussed above, and roof portion 132 may be subsequently joined to pillar portion 134 with a connection clip or other joining member. In some configurations, roof portion 132 may be formed from two or more sections of tube material, and then joined to pillar portion 134. In other configurations, roof portion 132 and pillar portion 134 may be formed of unitary construction, and pillar portion 134 may be subsequently joined to a separately-formed lower portion 136. Accordingly, draintube 126 may be formed from a single element or multiple joined elements.

Draintube 126 may be formed to have relatively smooth inner and outer surfaces. As an alternative, and as depicted in FIGS. 7 and 16-18, draintube 126 may have a corrugated configuration. That is, one or both of the inner and outer surfaces may have a wavy or otherwise undulating configuration. An advantage to the corrugated configuration is that the polymer material forming draintube 126 defines various rings that extend around the circumference of draintube 126, and the rings permit flexibility while imparting additional strength and resistance to collapsing when draintube 126 is compressed.

When incorporated into motor vehicle 100, end 128 of draintube 126 is joined to tray 124 such that roof portion 132 extends below roof panel 104, pillar portion 134 extends downward and adjacent to one of pillars 106, and lower portion 136 is positioned adjacent to the lower area of motor vehicle 100. In order to secure the position of draintube 126 within motor vehicle 100, various connection members 138 may be utilized, as depicted in FIG. 7. More particularly, connection members 138 are joined with draintube 126 in various locations and are secured to specific portions of motor vehicle 100. For example, one of more of connection members 138 may be secured to roof panel 104, support member 142, and other elements within motor vehicle 100.

Figure 19:
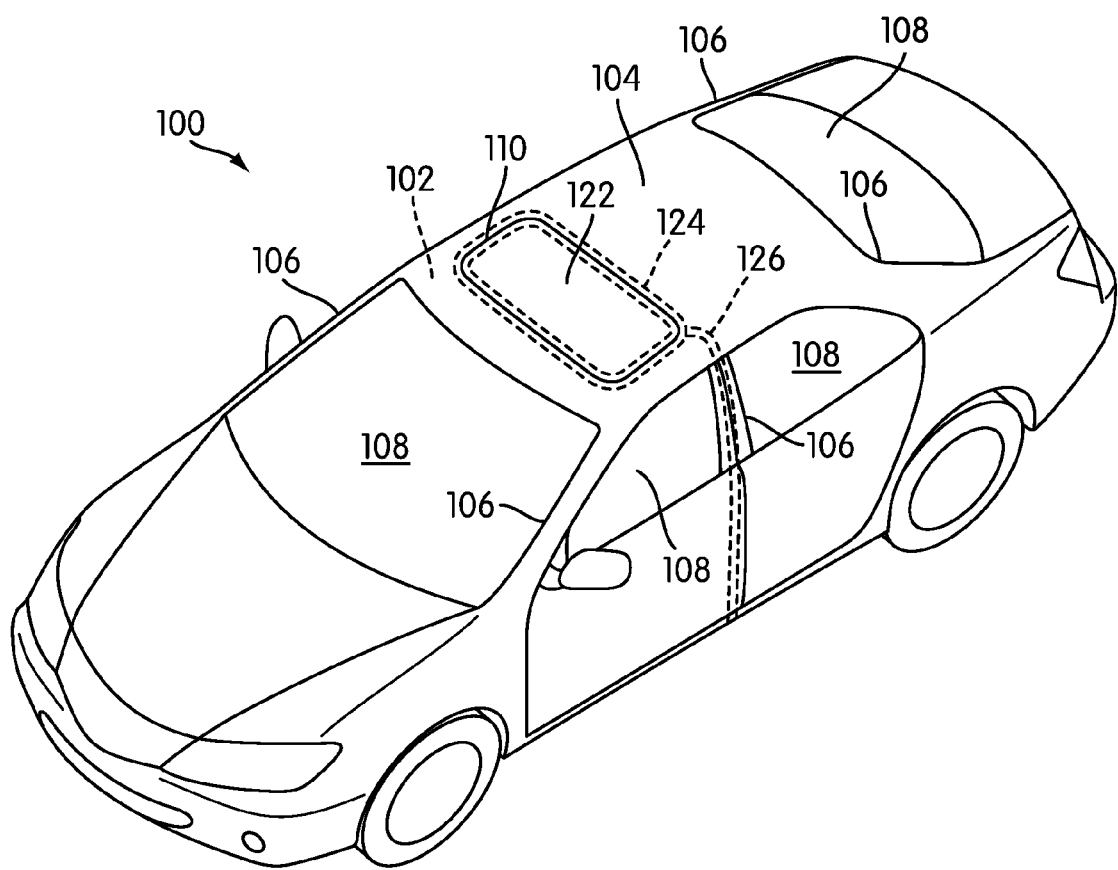
FIG. 19 is a perspective view of the motor vehicle depicting another configuration of the sunroof system.

Conventionally, pillars located in a front area of a motor vehicle passenger compartment are referred to as A-pillars, pillars located in a central area of the passenger compartment are referred to as B-pillars, and pillars located in a rear area of the passenger compartment are referred to as C-pillars. Although draintube 126 is depicted as extending through the pillar 106 located in a right-rear area of motor vehicle 100 (i.e., a C-pillar), draintube 126 may extend through any of pillars 106 (i.e., an A-pillar, a B-pillar, or a C-pillar). With reference to FIG. 19, another configuration of motor vehicle 100 is depicted, wherein draintube 126 extends through a right-central pillar 106 (i.e., a B-pillar). In further configurations, draintube 126 may extend through an A-pillar or through any of pillars 106 located on a left side of motor vehicle 100. Accordingly, the specific path that draintube extends through between tray 124 and the lower area of motor vehicle 100 may vary significantly.

Based upon the above discussion, sunroof system 100 incorporates draintube 126 for expelling fluid that enters sunroof system 100 from an exterior of motor vehicle 100 A section of draintube 126 may have a one-piece configuration that includes portions with different cross-sectional shapes. For example, one portion may have a circular cross-sectional shape and another portion may have a non-circular cross-sectional shape. In areas where space is limited, for example, the portion of draintube 126 with the non-circular cross-sectional shape may be beneficial in providing additional space for other components or otherwise permitting draintube 126 to fit within a particular space in motor vehicle 100. Accordingly, the use of different cross-sectional shapes permits draintube 126 to extend through areas of motor vehicle 100 where, for example, space is limited.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A sunroof system for a motor vehicle, the sunroof system comprising a movable sunroof panel and a draintube, a first end of the draintube being located proximal the sunroof panel to collect fluid that enters the sunroof system from an exterior of the motor vehicle, and a second end of the draintube being in fluid communication with the first end and located to expel the fluid, a section of the draintube located between the first end and the second end having a one-piece configuration that includes, a first portion having a first exterior cross-sectional shape, a second portion having a second exterior cross-sectional shape, and a third portion having a third exterior cross-sectional shape;

the second portion being disposed between the first portion and the third portion;

the first exterior cross-sectional shape and the third exterior cross-Sectional shape being generally circular; and the first exterior cross-sectional shape being different than the second exterior cross-sectional shape;

wherein the second portion extends downward and along a pillar of the motor vehicle, and the second portion has a length that generally corresponds with the length of the pillar.

2. The sunroof system recited in claim 1, wherein the second exterior cross-sectional shape has two substantially straight sides and two rounded end areas.

3. The sunroof system recited in claim 1, wherein the second portion is located within a pillar of the motor vehicle.

4. The sunroof system recited in claim 3, wherein the second portion is adjacent to an airbag component of the motor vehicle.

5. The sunroof system recited in claim 1, wherein the first portion and the second portion of the draintube have a corrugated configuration.

6. A sunroof system for a motor vehicle, the sunroof system comprising a draintube for expelling fluid that enters the sunroof system from an exterior of the motor vehicle, a section of the draintube having a one-piece configuration that includes a first portion having a first exterior cross-sectional shape, a second portion having a second exterior cross-sectional shape, and a third portion having a third exterior cross-sectional shape, the second portion being disposed between the first portion and the third portion;

the first exterior cross-sectional shape and the third exterior cross-sectional shape being generally circular;

the first exterior cross-sectional shape being different than the second exterior cross-sectional shape; and the second portion being located within a pillar of the motor vehicle;

wherein the second portion extends downward and along a pillar of the motor vehicle, and the second portion has a length that generally corresponds with the length of the pillar.

7. The sunroof system recited in claim 6, wherein a width of the second portion is substantially equal to a width of the first portion.

8. The sunroof system recited in claim 6, wherein a width of the second portion is greater than a width of the first portion.

9. The sunroof system recited in claim 6, wherein the second portion of the draintube is located adjacent to an airbag component of the motor vehicle.

10. The sunroof system recited in claim 6, wherein the second exterior cross-sectional shape is elongate and has two substantially straight sides and two rounded end areas.

11. The sunroof system recited in claim 6, wherein the draintube is formed from a thermoplastic polymer material.

12. The sunroof system recited in claim 6, wherein the first portion and the second portion of the draintube have a corrugated configuration.

13. A sunroof system for a motor vehicle, the sunroof system comprising:

at least one roof panel that defines an opening;

a sunroof panel that is movable between a closed position and an open position, the sunroof panel being located within the opening in the closed position, and the sunroof panel being at least partially located apart from the opening in the open position;

a tray for collecting fluid that enters the sunroof system between the roof panel and the sunroof panel; and a draintube extending from the tray for expelling the fluid, the draintube having a section with a one-piece configuration that includes a first portion, a second portion, and a third portion, the first portion being located adjacent to the roof panel, and the first portion having a circular exterior cross-section, the second portion being located within a pillar of the motor vehicle and adjacent to an airbag component of the motor vehicle, and the second portion having a non-circular exterior cross-section, the third portion extending from the pillar to a lower area of the motor vehicle, and the third portion having a circular exterior cross-section, wherein the first portion and the second portion of the draintube have a corrugated configuration, the second portion extends downward and along a pillar of the motor vehicle, and the second portion has a length that generally corresponds with the length of the pillar.

14. The sunroof system recited in claim 13, wherein the non-circular exterior cross-section of the second portion has an elongate shape with two substantially straight sides and two rounded end areas.

15. The sunroof system recited in claim 13, wherein the pillar is located between a side window and a rear window of the motor vehicle.

16. The sunroof system recited in claim 13, wherein the draintube is formed from a thermoplastic polymer material.

17. A draintube for a sunroof system of a motor vehicle, the draintube comprising (a) a first portion having a circular exterior cross-sectional shape, the first portion extending from a tray of the sunroof system to a pillar of the motor vehicle, (b) a second portion having a non-circular exterior cross-sectional shape, the second portion extending downward and along the pillar, and (c) a third portion having a circular exterior cross-sectional shape, the third portion extending from the pillar to a lower area of the motor vehicle, each of the first portion, the second portion, and the third portion having a corrugated configuration, and the draintube being formed of unitary construction, wherein the second portion has a length that generally corresponds with the length of the pillar.

18. The draintube recited in claim 17, wherein the non-circular exterior cross-sectional shape of the second portion is an elongate shape with two substantially straight sides and two rounded end areas.

19. The draintube recited in claim 17, wherein the second portion is adjacent to an airbag component of the motor vehicle.

20. The draintube recited in claim 17, wherein the draintube is formed from a thermoplastic polymer material.

* * * * *